US007016669B2

(12) United States Patent
Aerrabotu et al.

(10) Patent No.: US 7,016,669 B2
(45) Date of Patent: Mar. 21, 2006

(54) METHOD AND APPARATUS FOR UPDATING A SUBSCRIBER IDENTITY IN A MOBILE COMMUNICATION DEVICE

(75) Inventors: Naveen Aerrabotu, Gurnee, IL (US); Charles P. Binzel, Bristol, WI (US); Bharat Srinivasan, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 110 days.

(21) Appl. No.: 10/397,457

(22) Filed: Mar. 26, 2003

(65) Prior Publication Data

US 2004/0192281 A1    Sep. 30, 2004

(51) Int. Cl.
*H04Q 7/20* (2006.01)
*H04Q 7/32* (2006.01)

(52) U.S. Cl. ............... 455/419; 455/418; 455/420; 455/558; 455/550.1; 455/412.1; 455/410; 455/411; 380/247; 340/5.8; 340/5.81

(58) Field of Classification Search ............... 455/558, 455/550.1, 412.1, 412.2, 403, 422.1, 410, 455/411, 418, 419, 420, 517, 436, 557, 432.1, 455/432.3, 435.1, 500; 340/5.8, 5.81; 380/247
See application file for complete search history.

(56) References Cited

U.S. PATENT DOCUMENTS 5,418,837 A * 5/1995 Johansson et al. .......... 455/558
5,864,757 A * 1/1999 Parker ......................... 455/418
5,940,773 A * 8/1999 Barvesten ................... 455/558
6,285,869 B1 * 9/2001 Shannon et al. ............ 455/411
6,694,152 B1 * 2/2004 Helle .......................... 455/558

OTHER PUBLICATIONS

*Global System for Mobile Communications*, 3GPP TS 22.022 V5.0.0 (Sep. 2002) Technical Specification, 3rd Generation Partnership Project; Technical Specification Group Services and Systems Aspects; Personalisation of Mobile Equipment (ME); Mobile functionality specification (Release 5), 22 pages.
*Global System for Mobile Communications*, ETSI TS 100 977 V8.2.0 (May 2000), Digital cellular telecommunications system (Phase 2+); Specification of the Subscriber Identity Module—Mobile Equipment (SIM—ME) interface (GSM 11.11 version 8.2.0 Release 1999), 167 pages.

* cited by examiner

*Primary Examiner*—Keith Ferguson
(74) *Attorney, Agent, or Firm*—Matthew C. Loppnow

(57) ABSTRACT

An apparatus and method for updating a subscriber identity in a mobile communication device. The apparatus can include a subscriber module, a memory configured to store the subscriber identity, a transceiver configured to receive a new subscriber identity from a wireless network, and a controller coupled to the memory, the transceiver, and the subscriber module. The controller can be configured to control operations of the mobile communication device. The controller can also be configured to re-personalize the mobile communication device to the new subscriber identity.

25 Claims, 3 Drawing Sheets

METHOD AND APPARATUS FOR UPDATING A SUBSCRIBER IDENTITY IN A MOBILE COMMUNICATION DEVICE

CROSS-REFERENCE TO RELATED APPLICATIONS

This application is related to the application entitled "Method and Apparatus For Multiple Subscriber Identities In A Mobile Communication Device," Motorola case number CS90091, filed on even date herewith and commonly assigned to the assignee of the present application.

BACKGROUND OF THE INVENTION

1. Field of Invention

The present invention is directed to a method and apparatus for updating a subscriber identity in a mobile communication device. In particular, the present invention is directed to a method and apparatus for receiving a new subscriber identity and re-personalizing a mobile communication device.

2. Description of Related Art

Presently a mobile communication device may be personalized to a particular security module for security purposes. Such a security module may be a Subscriber Identity Module (SIM), a User Services Identity Module (USIM), or any other security module. The security module can contain a subscriber identity such as a code group, an International Mobile Subscriber identity (IMSI), or any other subscriber identity. The personalization is an anti-theft feature. When a mobile communication device is personalized to a particular security module, it can refuse to operate with another security module. Thus, if the mobile communication device is stolen, the thief cannot use the mobile communication device with another security module. While this does not prevent the mobile communication device from being stolen, it does make the mobile communication device less attractive to the thief.

The mobile communication device can be personalized by storing a subscriber identity of the current subscriber module in the mobile communication device and setting a personalization indicator to "on." Then, whenever a subscriber module is inserted or the mobile communication device is powered up with a subscriber module in place, the subscriber identity is read from the subscriber module and checked against the stored subscriber identity. If there is no match, access to the mobile communication device functions is blocked and the mobile communication device may only allow emergency calls to be placed from the mobile communication device.

Unfortunately, typically the mobile communication device may only be personalized to a single subscriber identity. Also, once the mobile communication device is personalized, it cannot be easily re-personalized with a new update subscriber identity. For example, a mobile communication device cannot receive a new updated subscriber identity from a wireless network for re-personalization. Thus, there is a need for a method and an apparatus for updating a subscriber identity in a mobile communication device.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
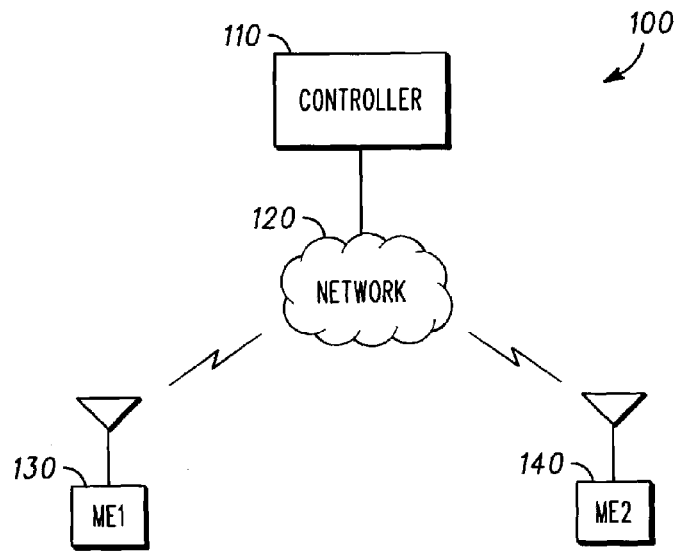
FIG. 1 is an exemplary block diagram of a system according to a preferred embodiment.

The invention provides an apparatus and method for updating a subscriber identity in a mobile communication device. The apparatus can include a subscriber module, a memory configured to store the subscriber identity, a transceiver configured to receive a new subscriber identity from a wireless network, and a controller coupled to the memory, the transceiver, and the subscriber module. The controller can be configured to control operations of the mobile communication device. The controller can additionally be configured to initially personalize the mobile communication device by reading the existing subscriber identity from an elementary file on the subscriber module, storing the existing subscriber identity in the mobile communication device, and setting a personalization indicator to on. The controller can also be configured to re-personalize the mobile communication device to the new subscriber identity. The memory can include a personalization list and the controller can re-personalize the mobile communication device by copying the new subscriber identity into the personalization list.

The controller can also be configured to process a data download message received from the wireless network, the data download message including the new subscriber identity. The controller can be configured to send a second data download message to the subscriber module, the second data download message including the new subscriber identity. The second data download message may be a reformatted first data download message. The controller can be further configured to receive a confirmation from the subscriber module, the confirmation confirming reception of the second data download message by the subscriber module. The controller can be further configured to process a subscriber identity refresh message received from the subscriber module, the subscriber identity refresh message indicating a new subscriber identity in the subscriber module. The controller can be further configured to send a terminal response to the subscriber module, the terminal response acknowledging reception of the subscriber identity refresh message. The controller can be further configured to verify re-personalization with the security module using a security algorithm. The controller can also be configured to re-personalize the mobile communication device by copying a subscriber identity from an elementary file in the subscriber module to the memory of the mobile communication device.

Among other benefits, the present invention can allow for repersonalization of a mobile communication device with a new update subscriber identity. For example, a mobile communication device can receive a new updated subscriber identity from a wireless network. The present invention can also provide for a method and an apparatus for updating a subscriber identity in a mobile communication device.

These and further benefits will become more apparent with reference to the Figures and the descriptions of the preferred embodiments.

FIG. 1 is an exemplary block diagram of a system 100 according to a preferred embodiment. The system 100 can include a network controller 110, a network 120, and one or more mobile communication devices 130 and 140. The mobile communication devices 130 and 140 may be mobile equipment such as wireless telephones, cellular telephones, personal digital assistants, or any other device that is capable of sending and receiving voice and data signals over a wireless network.

In an exemplary embodiment the network controller 110 is connected to the network 120. The network controller 110 may be included in a base transceiver station, a service center, or any other device on the network 120. The network 120 may include any type of network that is capable of sending and receiving communication signals. For example, the network 120 may include a data network, such as the Internet, an Intranet, a local area network (LAN), a wide area network (WAN), a cable network, and other like communication systems. The network 120 may also include a telecommunications network, such as a local telephone network, long distance telephone network, cellular telephone network, satellite communications network, cable television network and other like communications systems. Furthermore, the network 120 may include more than one network and may include a plurality of different types of networks. Thus, the network 120 may include a plurality of data networks, a plurality of telecommunications networks, a combination of data and telecommunications networks and other like communication systems. Preferably, the network 120 is a wireless network.

In operation, the network controller 110 can control operations on the network 120. The mobile communication devices 130 and 140 can transmit and receive wireless signals to and from the network 120. For example, the mobile communication device 130 can connect a voice call with the mobile communication device 140. Thus, users of the mobile communication devices 130 and 140 can audibly communicate with each other. Also, the mobile communication device 130 can connect a data call with the mobile communication device 140. Thus, users of the mobile communication devices 130 and 140 can send and receive data to and from each other and the network 120.

According to a preferred embodiment, the network controller 110 can be used to update a subscriber identity in the mobile communication device 130. For example, the network controller 110 can send a message including a subscriber identity to the mobile communication device 130. The message may be a short messaging service message such as a short messaging service point to point data download message, may be a proprietary network message, or may be any other message useful for sending a subscriber identity to a mobile communication device 130. The network controller 110 can also receive an acknowledgement message from the mobile communication device 130 confirming reception of the initial message by the mobile communication device 130.

Figure 2:
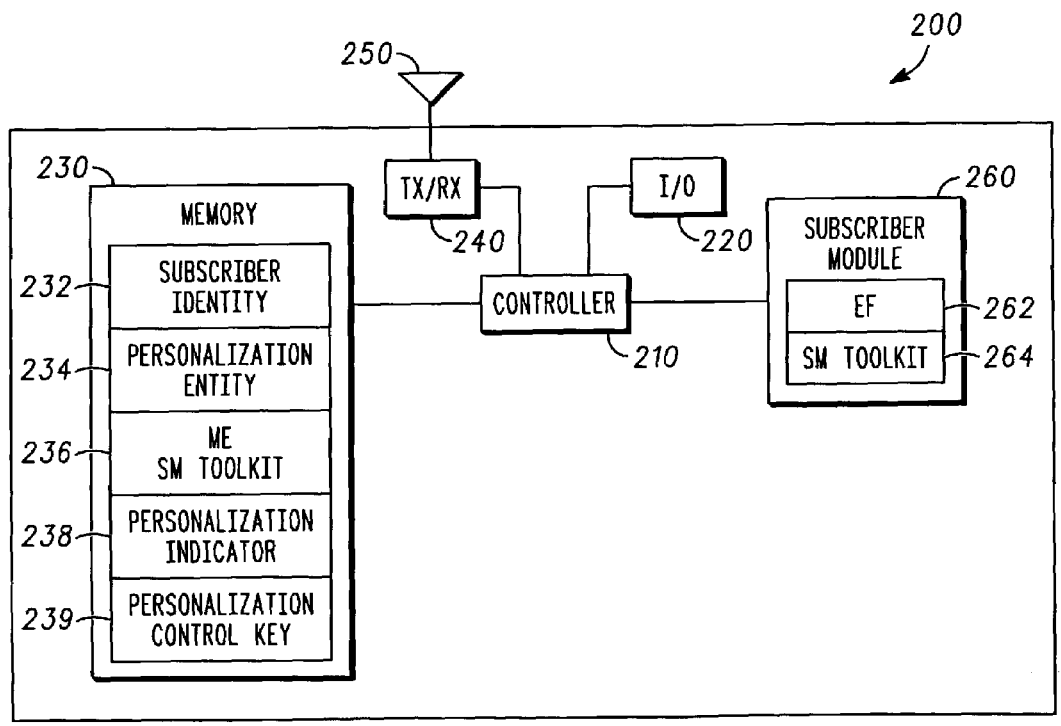
FIG. 2 is an exemplary block diagram of a mobile communication device according to a preferred embodiment.

FIG. 2 is an exemplary block diagram of a mobile communication device 200, such as the mobile communication device 130, according to a preferred embodiment. The mobile communication device 200 can include a controller 210, input and output circuitry 220, a memory 230, a transceiver 240, an antenna 250 and a removable subscriber module 260. The subscriber module 260 may be a subscriber identity module, a user services identity module, or any other subscriber module. The subscriber module 260 can include at least one elementary file 262 and a subscriber module toolkit 264. The elementary file 262 can contain at least one subscriber identity. Additional elementary files may exist in the subscriber module 260 that contain additional subscriber identities and additional data. The subscriber module toolkit 264 can interact with the mobile communication device 200 to perform various functions with the mobile communication device 200.

The memory 230 may be a random access memory, a read only memory, an optical memory, or any other memory. The memory 230 can include subscriber identity storage 232, a personalization entity 234, a mobile equipment or mobile communication device subscriber module toolkit 236, a personalization indicator 238, and a personalization control key 239. The personalization entity 234 and the mobile communication device subscriber module toolkit 236 may also reside on the controller 210, as independent software or hardware modules, or in any other format on the mobile communication device 200. The subscriber identity storage 232 can contain a subscriber identity that the mobile communication device 200 is currently personalized to. The subscriber identity storage 232 may also contain a personalization list containing one or multiple subscriber identities. The personalization entity 234 can perform functions to personalize the mobile communication device 200 to a subscriber identity stored in the subscriber identity storage 232. The mobile communication device subscriber module toolkit 236 can control operations and communications with the subscriber module 260. The personalization indicator 238 can be set to "on" to indicate the mobile communication device 200 is personalized to a subscriber identity of a subscriber module. The personalization control key 239 controls the personalization of the mobile communication device 200. For example, the personalization control key 239 can be selected by a user to allow for de-personalization of the mobile communication device 200. The transceiver 240 may include a transmitter and/or a receiver. The input and output circuitry 220 can include a microphone, a display, a speaker, a user input such as a keypad and buttons, or any other input and output circuitry.

In operation, the input and output circuitry 220 can accept various forms of input and output signals. For example, the input and output circuitry 220 can receive and output audio signals and data signals. The memory 230 can store data and software used in the mobile communication device 200. The transceiver 240 can transmit and/or receive data over a wireless network such as network 120. The controller 210 can control the operation of the mobile communication device 200.

When the mobile communication device 200 is personalized to a particular subscriber module or subscriber identity, it can refuse to operate with any other subscriber module or subscriber identity. The mobile communication device 200 can be personalized by storing the subscriber identity, such as a subscriber module code group, of the relevant subscriber module 260 in the subscriber identity storage 232 and setting the personalization indicator 238 to on. Whenever a subscriber module is inserted or the mobile communication device 200 is powered up with a subscriber module already in place, the subscriber identity is read from the subscriber module and checked against the subscriber identity stored in the subscriber identity storage 232. If there is no match, the mobile communication device 200 can go into an emergency calls only mode where only emergency calls can be placed from the mobile communication device 200. As mentioned, the personalization feature is controlled by the personalization control key 239. This key can be selected by a user at personalization and can be later entered into the mobile communication device 200 to depersonalize the mobile communication device 200. The controller 210 can also support multiple instances of subscriber module personalization. For example, a subscribe identity can be read from a subscriber module and checked against a list of subscriber identities stored in the subscriber identity storage 232.

A personalization check is performed whenever a subscriber module 260 is inserted into the mobile communication device 200 or whenever the mobile communication device 200 is powered up with a subscriber module 260 already in place. When more than one personalization is active in the mobile communication device 200, normal mode of operation can include performing any outstanding personalization checks. To perform a personalization check, the controller 210 first checks whether the mobile communication device 200 is personalized by checking the personalization indicator 238. If the personalization indicator 238 is set to "off," the personalization check can be stopped and the mobile communication device 200 can go into normal mode of operation and omit the remaining steps of the check. If the personalization indicator 238 is set to "on," the controller 210 continues the check. The controller 210 can then read the subscriber identity from the subscribe module 260. For example, the controller 210 can read the subscriber identity from the elementary file 262. The controller 210 then performs the personalization check by checking the read subscriber identity against a subscriber identity or list of subscriber identities stored in the subscriber identity storage 232. If no match is found, the controller 210 can display an appropriate message on a display such as "Insert correct subscriber module" and can then go into an emergency calls only mode. Alternately, a user may be prompted to enter a special de-personalization code to de-personalize the mobile communication device 200 and allow for normal operation. Otherwise, if a match is found, the mobile communication device 200 can go into normal mode of operation.

The personalization of a mobile communication device 200 results in the personalization control key 239 being set, the personalization indicator 238 being set to "on," and the storage, in the subscriber identity storage 232, of at least one subscriber identity to which the mobile communication device 200 is personalized. To personalize the mobile communication device 200, first, the relevant subscriber identity is entered into the subscriber identity storage 232 either by reading the subscriber identity from the subscriber module 260, or by any other process such as one defined by a manufacturer. Second, the controller 210 can perform any necessary setup and necessary pre-personalization checks that may be useful for personalization. If the necessary checks are correct, the subscriber identity can be stored in the subscriber identity storage 232. If the checks fail, the personalization process can be terminated. Third, to personalize the mobile communication device 200 to more than one subscriber module, the above steps can be repeated. Fourth, the personalization control key 239 can be stored. A single personalization control key 239 can be used for both single and multiple subscriber module personalization. Finally, the personalization indicator 238 can be set to "on."

To de-personalize the mobile communication device 200, the correct personalization control key 239 can be entered. The subscriber module 260 may or may not be present for de-personalization. If the subscriber module 260 is present, de-personalization may be offered regardless of whether any useful subscriber module personalization checks pass or fail. De-personalization can be provided by entry on a keypad of the input and output circuitry 220. Other de-personalization methods may be used. To de-personalize the mobile communication device 200, a user can enter the personalization control key. If the entered personalization control key is the same as the one stored in the memory 230, the personalization indicator 238 is set to "off." If the entered and stored personalization control key values differ, the de-personalization process can stop and the mobile communication device 200 can remain personalized.

According to a preferred embodiment, the controller 210 can initially personalize the mobile communication device 200 with the existing subscriber identity by reading an existing subscriber identity from the elementary file 262 on the subscriber module 260, storing the existing subscriber identity in the mobile communication device 200, such as in the memory 230 or the subscriber identity storage 232, and setting the personalization indicator 238 to on.

The controller 210 can receive, from the network 120 such as a wireless network, a new subscriber identity at the mobile communication device 200 already personalized with an existing subscriber identity and re-personalize the mobile communication device 200 to the new subscriber identity. The controller 210 can re-personalize the mobile communication device 200 by copying the new subscriber identity into a personalization list located on the mobile communication device, such as the subscriber identity storage 232 to replace or add to the old subscriber identity. The controller 210 can receive the new subscriber identity by receiving a data download message from the network 120 at the mobile communication device 200 already personalized with the existing subscriber identity, the data download message including the new subscriber identity. The controller 210 can send a second data download message to the subscriber module 260, the second data download message including the new subscriber identity. The controller 210 can then receive a confirmation from the subscriber module 260, the confirmation confirming reception of the second data download message by the subscriber module 260. The controller 210 can receive a subscriber identity refresh message from the subscriber module 260, the subscriber identity refresh message indicating the new subscriber identity has been updated in the subscriber module 260 and repersonalization can proceed. The controller 210 can send a terminal response to the subscriber module 260, the terminal response acknowledging reception of the subscriber identity refresh message. The controller 210 can verify re-personalization with the security module 260 using a security algorithm. Such re-personalizing can include copying a subscriber identity from an elementary file 262 in the subscriber module 260 to a memory 230 in the mobile communication device 200.

Figure 3:
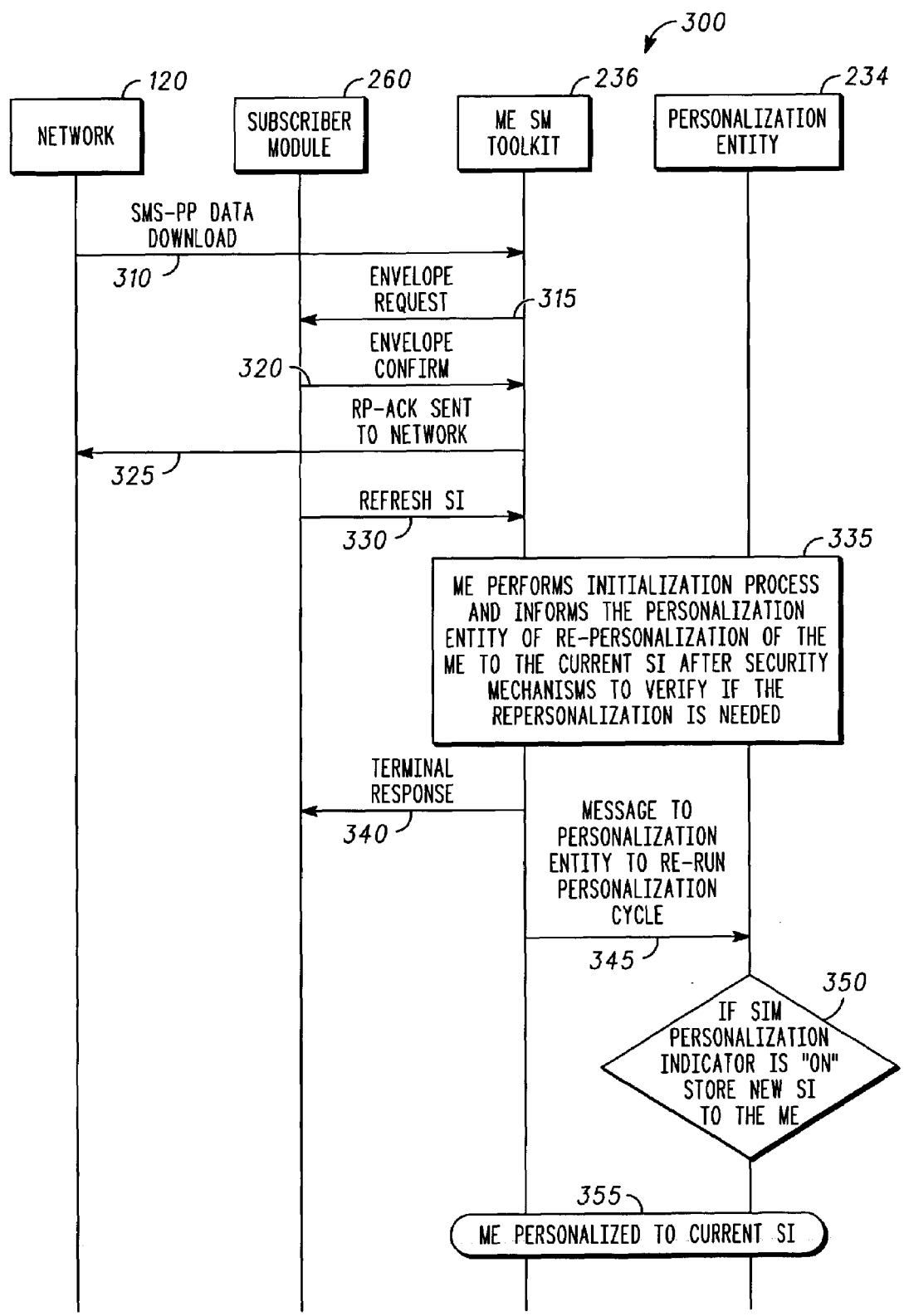
FIG. 3 is an exemplary message sequence chart outlining the operation of a system including a mobile communication device according to a preferred embodiment.

FIG. 3 is an exemplary message sequence chart 300 outlining the operation of the system 100 including the mobile communication device 200 according to a preferred embodiment. The sequence chart 300 can include the operations of the network 120, the subscriber module 260, and the mobile equipment subscriber module toolkit 236 and the personalization entity 234 on the mobile communication device 200. In operation, in step 310, the network can send a message to mobile communication device 200, such as a short messaging service point-to-point data download message. The message informs the mobile communication device 200 that data is included and the message can include data such as a new subscriber identity. The message can be encrypted and require authentication to access the included new subscriber identity. In step 315, the mobile equipment subscriber module toolkit 236 can reformat the message and send it to the subscriber module 260, for example, as a second data download message. In step 320, the subscriber module 260 can confirm reception of the message and can update its memory to include the new data, such as the new subscriber identity in its elementary file 262. In step 325, the mobile communication device 200 can acknowledge receipt of the message by sending an acknowledgement message to the network 120. In step 330, the subscriber module 260 can issue a command or send a message to the mobile equipment subscriber module toolkit 236 telling the mobile equipment subscriber module toolkit 236 that the subscriber identity, such as an IMSI, a code group, or any other subscriber identity, has changed. For example, the subscriber module 260 can issue a REFRESH Subscriber Identity message. In step 335, the mobile communication device 200 can perform an initialization process and instruct the personalization entity 234 to initialize the mobile communication device 200 for repersonalization to the current subscriber identity in the subscriber module 260. For repersonalization verification, this step may include various security mechanisms such as the use of security passwords, encryption, public keys, private keys, or any other security mechanisms. In step 340, the mobile equipment subscriber module toolkit 236 can send a message to the subscriber module 260 acknowledging the change of the subscriber identity. In step 345, the mobile equipment subscriber module toolkit 236 can send a message to the personalization entity 234 instructing the personalization entity 234 to repersonalize the mobile communication device 200 to the new subscriber identity in the subscriber module 260. In step 350, if the subscriber module personalization indicator 238 is set to "on," the personalization entity 234 repersonalizes the mobile communication device 200 by storing the new subscriber identity in the subscriber identity storage 232. In step 355, the mobile communication device 200 is repersonalized to the new subscriber identity.

Figure 4:
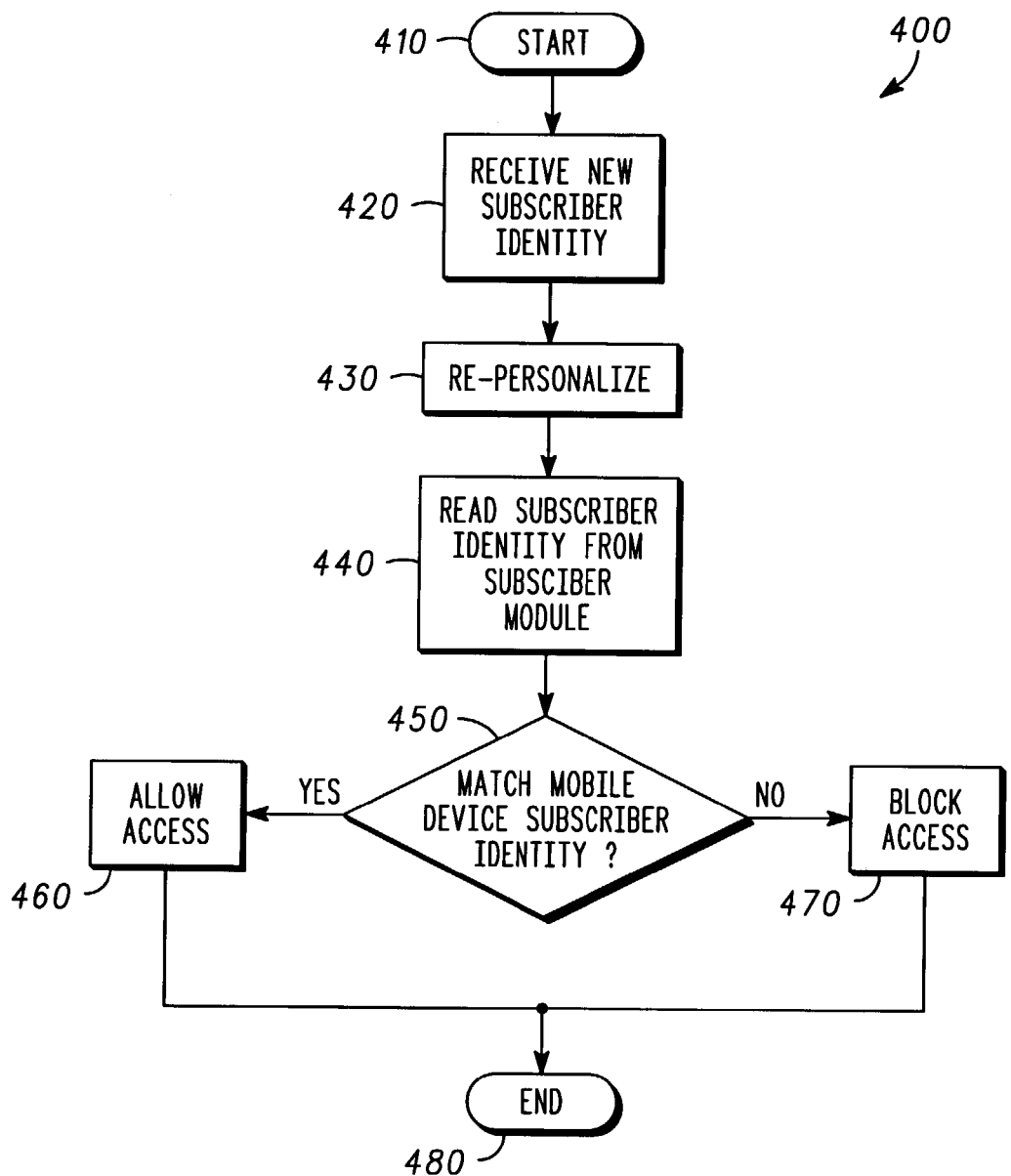
FIG. 4 is an exemplary flowchart outlining the operation of a mobile communication device according to a preferred embodiment.

FIG. 4 is an exemplary flowchart 400 outlining the operation of the mobile communication device 200 according to a preferred embodiment. The mobile communication device 200 can already be personalized with an existing subscriber identity. In step 410, the flowchart begins. In step 420, the mobile communication device 200 receives a new subscriber identity. For example, the mobile communication device 200 can receive the new subscriber identity from the network 120. In step 430, the mobile communication device 200 can repersonalize to the new subscriber identity. In step 440, when the repersonalized mobile communication device 200 is powered up, or when a subscriber module is replaced in the mobile communication device 200, the mobile communication device 200 can read the subscriber identity from the subscriber module 260. In step 450, the mobile communication device 200 can determine whether the subscriber identity of the subscriber module matches a subscriber identity stored in the mobile communication device 200. If so, in step 460, the mobile communication device 200 can allow access mobile communication functions of the mobile communication device 200. If the subscriber identity of the subscriber module 260 does not matches a subscriber identity stored in the mobile communication device 200, in step 470, the mobile communication device 200 can block access to most functions and can only allow access to emergency communication functions. In step 480, the flowchart ends.

The method of this invention is preferably implemented on a programmed processor. However, the network controller 110 and the controller 210 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A method for updating a subscriber identity in a mobile communication device on a wireless network, the mobile communication device including a subscriber module, the mobile communication device already personalized with an existing subscriber identity, the method comprising:
   receiving, from the wireless network, a new subscriber identity at the mobile communication device already personalized with an existing subscriber identity; and
   re-personalizing the mobile communication device o the new subscriber identity while the mobile communication device is still personalized to the existing subscriber identity.

2. The method according to claim 1, further comprising re-personalizing the mobile communication device by copying the new subscriber identity into a personalization list located on the mobile communication device.

3. The method according to claim 1, further comprising initially personalizing the mobile communication device with the existing subscriber identity by:
   reading the existing subscriber identity from an elementary tile on the subscriber module;
   storing the existing subscriber identity in the mobile communication device; and
   setting a personalization indicator to on.

4. The method according to claim 1, wherein receiving further comprises receiving a data download message from the wireless network at the mobile communication device already personalized with the existing subscriber identity, the data download message including the new subscriber identity.

5. The method according to claim 4, further comprising sending a second data download message to the subscriber module, the second data download message including the new subscriber identity.

6. The method according to claim 5, further comprising receiving a confirmation from the subscriber module, the confirmation confirming reception of the second data download message by the subscriber module.

7. The method according to claim 1, further comprising receiving a subscriber identity refresh message from the subscriber module, the subscriber identity refresh message indicating a new subscriber identity in the subscriber module.

8. The method according to claim 7, further comprising sending a terminal response to the subscriber module, the terminal response acknowledging reception of the subscriber identity refresh message.

9. The method according to claim 1, further comprising verifying re-personalization with the security module using a security algorithm.

10. The method according to claim 1, wherein re-personalizing further comprises copying a subscriber identity from an elementary file in the subscriber module to a memory in the mobile communication device.

11. A mobile communication device comprising:
a subscriber module;
a memory configured to store an initial subscriber identity;
a transceiver configured to receive a new subscriber identity from a wireless network; and
a controller coupled to the memory, the transceiver, and the subscriber module, the controller configured to control operations of the mobile communication device, the controller also configured to initially personalize the mobile communication device with the initial subscriber identity, the controller also configured to re-personalize the mobile communication device to the new subscriber identity while the mobile communication device is still personalized to the initial subscriber identity.

12. The mobile communication device according to claim 11,
wherein the memory comprises a personalization list, and wherein the controller is further configured to re-personalize the mobile communication device by copying the new subscriber identity into the personalization list.

13. The mobile communication device according to claim 11, wherein the controller is further configured to initially personalize the mobile communication device by reading the existing subscriber identity from an elementary file on the subscriber module, storing the existing subscriber identity in the mobile communication device, and setting a personalization indicator to on.

14. The mobile communication device according to claim 11, wherein the controller is further configured to process a data download message received from the wireless network, the data download message including the new subscriber identity.

15. The mobile communication device according to claim 14, wherein the controller is further configured to send a second data download message to the subscriber module, the second data download message including the new subscriber identity.

16. The mobile communication device according to claim 15, wherein the controller is further configured to receive a confirmation from the subscriber module, the confirmation confirming reception of the second data download message by the subscriber module.

17. The mobile communication device according to claim 11, wherein the controller is further configured to process a subscriber identity refresh message received from the subscriber module, the subscriber identity refresh message indicating a new subscriber identity in the subscriber module.

18. The mobile communication device according to claim 17, wherein the controller is further configured to send a terminal response to the subscriber module, the terminal response acknowledging reception of the subscriber identity refresh message.

19. The mobile communication device according to claim 11, wherein the controller is further configured to verify re-personalization with the security module using a security algorithm.

20. The mobile communication device according to claim 11, wherein the controller is further configured to re-personalize the mobile communication device by copying a subscriber identity from an elementary file in the subscriber module to the memory of the mobile communication device.

21. A method for operating a mobile communication device including a subscriber module on a wireless network, the mobile communication device already personalized with a first subscriber identity, the method comprising:
receiving, from the wireless network, a second subscriber identity at the mobile communication device already personalized with an first subscriber identity;
re-personalizing the mobile communication device with the second subscriber identity by storing the second subscriber identity in a memory of the mobile communication device while keeping the mobile communication device personalized to the first subscriber identity;
reading a subscriber module subscriber identity from the subscriber module;
comparing the subscriber module subscriber identity with the second subscriber identity stored in the mobile communication device; and
blocking use of selected features of the mobile communication device if the subscriber module subscriber identity does not match the second subscriber identity stored in the memory of the mobile communication device.

22. The method according to claim 21, wherein re-personalizing further comprises storing the second subscriber identity in an elementary file on the subscriber module.

23. The method according to claim 21, wherein reading further comprises reading a subscriber module subscriber identity from the subscriber module when the mobile communication device is turned on.

24. The method according to claim 21, wherein reading further comprises reading a subscriber module subscriber identity from the subscriber module when the subscriber module is inserted into the mobile communication device.

25. The method according to claim 21, wherein receiving further comprises receiving a data download message from the wireless network at the mobile communication device already personalized with the first subscriber identity, the data download message including the second subscriber identity.

* * * * *